Figure 1:
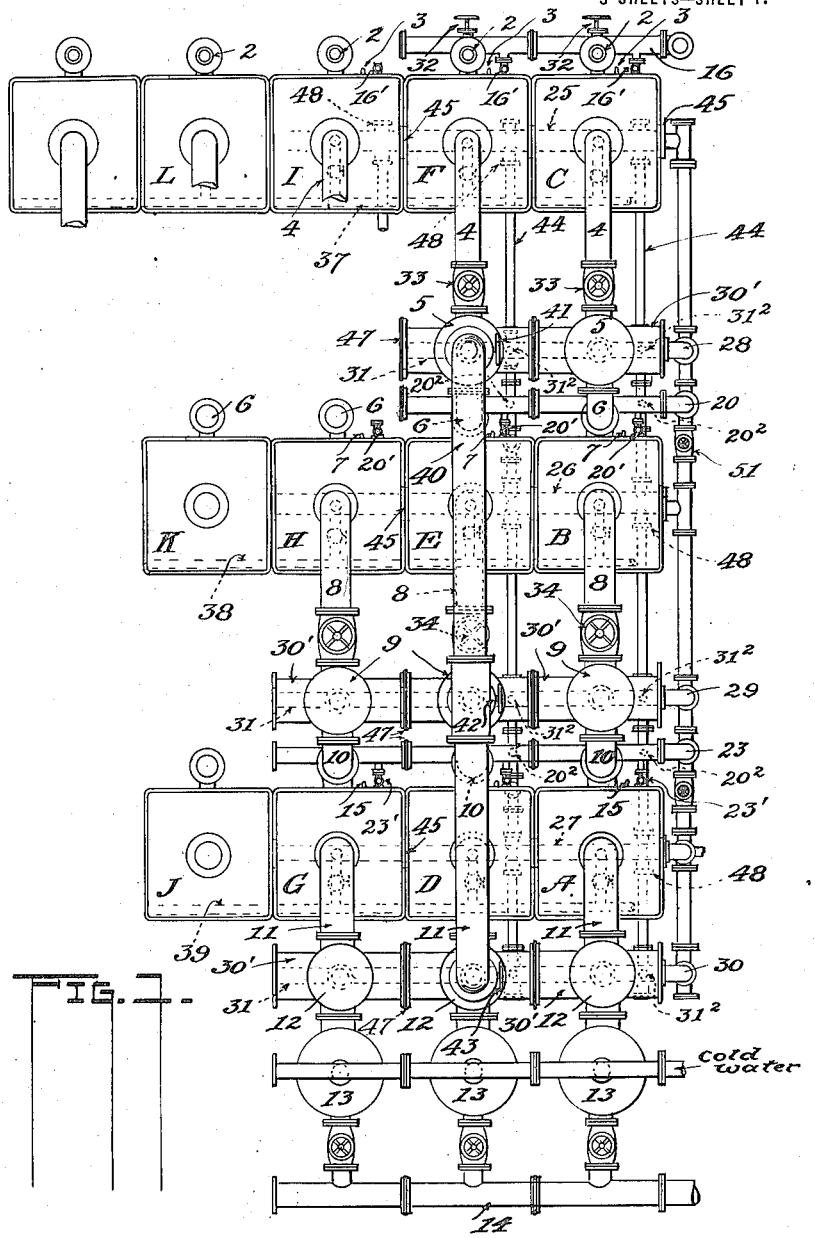

L. P. BAUER.
EVAPORATING APPARATUS.
APPLICATION FILED APR. 29, 1911.

1,143,744.

Patented June 22, 1915.
3 SHEETS—SHEET 1.

Witnesses:
Eunice Beckum
Ruth Deohler

Inventor:
Louis P. Bauer,
By L. M. Thurlow
Atty.

Witnesses:
Eunice Beckum
Ruth Deobler

Inventor:
Louis P. Bauer,
By L. M. Thurlow
Atty.

UNITED STATES PATENT OFFICE.

LOUIS P. BAUER, OF PEKIN, ILLINOIS.

EVAPORATING APPARATUS.

1,143,744.  Specification of Letters Patent. Patented June 22, 1915.

Application filed April 29, 1911. Serial No. 624,244.

*To all whom it may concern:*

Be it known that I, LOUIS P. BAUER, citizen of the United States, residing at Pekin, in the county of Tazewell and State of Illinois, have invented certain new and useful Improvements in Evaporating Apparatus; and I do hereby declare that the following is a full, clear, and exact description of the invention, which will enable others skilled in the art to which it appertains to make and use the same.

This invention relates to an evaporating apparatus.

The invention has for its primary object the adaptability of an apparatus of this type for small industries as well as exceedingly large ones by providing a system of units whereby the capacity of the apparatus may be increased from time to time as needed.

A further object is to construct an evaporating apparatus for a desired number of effects, to which may be added other units for increasing the capacity so as to adapt the apparatus to a growing industry no matter what its size or requirements may be.

A further object is the provision of a single effect evaporating apparatus whose capacity may be increased from time to time as necessity requires and in which any one effect or unit may be disconnected from the apparatus for repairs without interrupting the evaporating process in the apparatus from which it has been separated or materially or appreciably decreasing the capacity of said apparatus.

Another object is to provide a multiple effect evaporating apparatus made up of units whereby the capacity of said apparatus may be increased from time to time as necessity requires and whereby the entire series or all the several effects or units may be interconnected in working relation.

A further object is to provide a multiple effect evaporating apparatus made up of a series of units adapted for inter-communication and including in its structure means whereby a single effect or a series of effects can be made non-communicable with other or adjacent effects so that liquors of totally different characters can be evaporated in the same apparatus without contaminating each other.

Still another object of the invention is the provision of an evaporating apparatus which can be built up to any capacity by bringing together units or effects whereby to increase the capacity of the apparatus as required, each unit or effect being provided with all necessary connections whereby when placed in position it can be readily connected up with others.

The adaptability in an evaporating apparatus is very important along the lines above pointed out, that is, in the sense of an increase in capacity to meet the demands of a growing business, besides adaptability in the sense of continuous service at practically a maximum capacity. In most, if not all, evaporators of which I am aware it is necessary, where business increases so that greater demands are made upon the apparatus, to install a larger apparatus in place of one already in use. This substitution, of course, entails a great expense. But the provision of an apparatus of a type to which parts can be added so as to increase the number of effects and whereby, also, the capacity for evaporating can be increased, if desired, is one of the main objects of the invention. That is, there is the provision of a system in an evaporating apparatus, made up of units, a few of which or a large number of which, may be used and which may be added to with but a comparatively small increase in expense for each added unit. In addition to the expense of substituting one apparatus for another the industry having such apparatus must be entirely idle during the change or even whenever slight repairs are to be made or in order to clean any one of the effects whereas in a unit system of the type to be described herein the interruption of the evaporating process is entirely unnecessary.

As each effect of my evaporator consists of one or more unit-pans joined to provide the capacity desired, and as the unit-pans are identical in construction the efficiency of all the pans no matter what the capacity is must necessarily be the same. This is not the case with various types of evaporators of which I am aware where the means used to increase the capacity often results in an efficiency loss. Repairs to one or more pans do not require that the entire system be shut down to admit of such repairing. Naturally the effect of shutting down one pan of any system will depend on the number of pans left in service to carry the load. In the present case, then, where the evaporator consists of a number of unit pans, the temporary elimination of one pan in the system will have but slight effect on the total capacity and in practical work, where the load is continually varying, would not be noticeable. Again, the advantage of being able to use an evaporator for evaporating several entirely different liquors, as pointed out in the objects, is one of importance and greatly to be desired.

Having outlined the general advantages the structures of my apparatus will be understood, as well as other objects, from the following specifications aided by the accompanying drawing wherein:—

Figure 2:
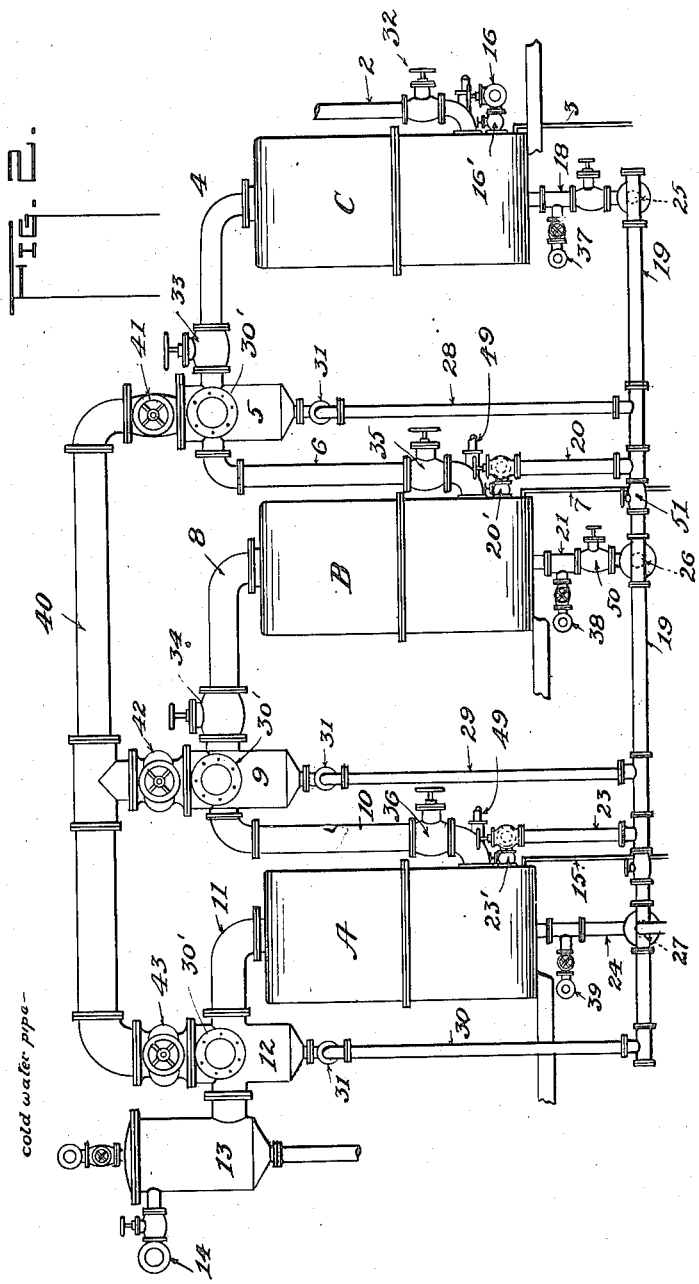
Figure 3:
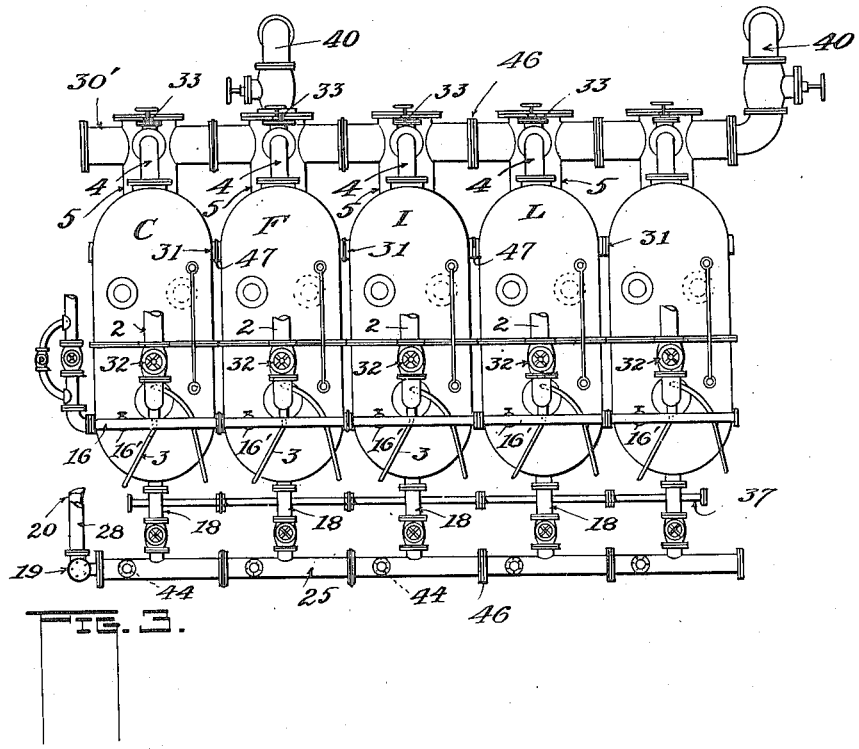
Figure 4:
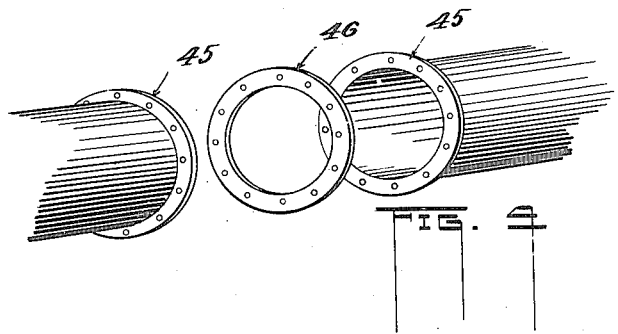
Figure 5:
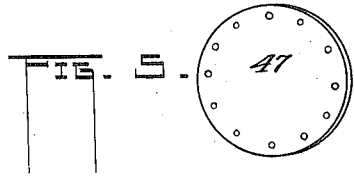

Figure 1 is a plan of my evaporating system showing the parts and some of the pipe connections. Fig. 2 is a side elevation of the apparatus showing single, double and triple effect pans or units and the connections for the same. Fig. 3 is a front elevation of the same. Fig. 4 shows certain pipe sections and a flange for the same in perspective. Fig. 5 shows a blind flange or plate to replace the flange shown in Fig. 4.

A, D, G, J, indicate a row of unit pans, while B, E, H, K, indicate a row of other pans arranged to have communication with those just described as will be explained presently, though all of the connections are not shown, while C, F, I, L, is another row of pans adapted for connection with the pans B, E, H, K, by connections to be described presently which, however, are not shown in full. The pans illustrated provide for single, double or triple effects as will appear later.

The numeral 2 indicates a series of pipes each for separately introducing the exhaust steam into any one of the pans C, F, I, L, which after condensing, passes through any suitable pipe 3, while the vapor driven off from the liquor under treatment in said pans passes over through pipes 4 into and through "catch alls" 5, well known to those versed in the art, thence through pipes 6 into the next series of pans B, E, H, where it forms the evaporating agent in those pans; the water of condensation therefrom passing off as in the first instance through pipe 7. The vapor from these said pans B, E, H, is given off through vapor pipes 8, thence through the "catch alls" 9 and pipe 10 into the pans A, D, G, to serve as the evaporating agent for the liquor in those pans. The vapor from the latter passes off through pipe 11 and "catch all" 12 to a condenser 13 with which is connected a pipe 14 leading to any usual vacuum pump, not shown; the water of condensation from the said pans A, D, G, passing off through a pipe 15. The liquor to be treated is introduced into the pans C, F, I, through a liquor line 16 and valved inlet pipes 16' which, after it has undergone partial evaporation, is drawn over to the pans B, E, H, K, through pipes 18, 19, 20 and 20' and from this it is again drawn off through pipe 21, the said pipe 19, and pipes 23 and 23' to the pans A, D, G, from which it is drawn off through pipes 24 by means of a pump not shown.

An equalizing pipe 25 Figs. 1 and 3 connects all of the pipes 18 of the several pans C, F, I, L, so that the liquors of each will pass to the pipe 19 connecting all of the series of pans or effects and likewise, a pipe 26 shown in Fig. 1 connects all of the pipes 21 below pans B, E, H, to the common pipe 19 described, and, again, a similar pipe 27 connects all of the pipes 24 of the pans A, D, G, with said pipe 19, the liquors being thus permitted to communicate with all of the pans of the entire system. Pipes at 28, 29 and 30 are connected with a "header" Fig. 1, made up of pipe sections 31 communicating with all of the "catch alls" of a series, leading to the pipe 19 so that any liquor that may be carried over through pipes 4, 8 and 11 due to entrainment will be returned to the liquor line. Also, pipe sections 30' form a continuous vapor line through the "catch-alls" by which vapor can communicate with all of the pans.

Each of the steam pipes 2 is provided with a valve 32 by which the steam may be shut off from any one of the pans and all of the pipes of the two series of vapor pipes 4 and 8 are provided with valves 33 and 34 respectively the purpose of which will appear presently. Also all of the pipes 6 and 10 through which vapor is conveyed to the pans B, E, H, and A, D, G, are also provided with valves 35 and 36, best shown in Fig. 2, by which to cut off the vapor passing over. Each series of the several pipes 18, 21, 24 for the liquor passing away from the various pans are connected by headers 37, 38 and 39 respectively through which the pans may be washed out or drained. A "special vapor" pipe 40 of which there may be more than one, if desired, Fig. 3, is connected with the several header sections 30' or with the "catch-alls" themselves as in said figure so that when desired the vapor from any one or all of the pans C, F, I, may pass around any one of the pans B, E, H, directly through and into the pans A, D, G, by closing the valve 35 in the pipe 6, of the pan of the particular pan of the series B, E, H, to be disconnected. The valve 34 of the vapor pipe 8 of the same pan is also closed and the valve 41 in one of the special vapor pipes 40 and a valve 42 thereof also opened. The vapor now passes into the vapor line 30' of "catch-alls" 9 from which it is distributed into pipes 10 thence to pans A, D, G. Or, on leaving said valves 41 and 42 closed the vapor will distribute through the vapor line 30' adjacent to the pans C, F, I, and then pass as before to the pans B, E, H, not shut off, and the vapor from those will finally pass into pans A, D, G. Or, again if it is the desire to use but a single effect by employing the pans C, F, I, only, the valve 42 is kept closed and a valve 43 in said pipe 40 is opened. In this event the vapor passes directly from any one or all of the pans C, F, I, to the condenser 13.

The various pipe connections and the valves in control of them have been described so that the construction of the apparatus and the mode of operation may be fully understood and whereby the action and the various results obtained through the system of connections will be readily apparent and other connections will now be explained herein to bring out certain other important advantages.

The pipe 19 described herein, it will be remembered, connects all of the series of pans so that all pans can communicate with one another through their respective pipes 25, 26, 27, also described, which connect with said pipe 19. Now, where it is desired to evaporate liquors of different kinds in the same apparatus, other pipes 44 answering in the same capacity as the pipe 19 are used to connect the said pipes 25, 26 and 27 each of the last named pipes being in short sections of a length substantially equal to the width of each pan, for convenience, and in the interest of compactness in the present instance, these said sections are connected by flanges, for instance, as indicated at 45 in Figs. 1 and 4, there being a ring or gasket 46 interposed between said flanges which, however, may be replaced by a blind flange, diaphragm or plate indicated at 47 in Fig. 5. By this means any one of the sections of the pipe 25 may be disconnected from others by removing the flange 46 and replacing it by the said plate 47 and thus each pan and its liquor can be separated from neighboring ones. This is also true of the headers 30' and 31 and in fact of all the pipes or conduits through the entire apparatus from front to rear, see Fig. 1, in which for the sake of clearness, the blind flanges 47 are shown in black. Any row of pans constituting single, double or triple effects may thus be isolated from the next row at its side. In Fig. 1 the broken lines show the said pipes 26 and 27 provided with T's 48 to receive the described pipe sections 44 which can be placed in position either when the apparatus is set up, or only as required. These form a pipe which answers in the same way as the pipe 19 when the separate evaporation of liquors is to be undertaken in any particular line of pans. The said pipes in being counterparts of the pipe 19 are connected with the header 31 by means of pipes 31² shown by broken lines in Fig. 1, which correspond with the pipes 28, 29 and 30. Also, pipes 20² in said Fig. 1 connect the pipes 20 and 23 with the pipes 44, and, of course the pipes 18, 20 and 24 at the bottoms of the pans C, F, I; B, E, H, K and A, D, G respectively are connected with said pipes. As to these pans F, E, D shown isolated in the drawings, the liquors carried thereby can be handled through said pipe 44, and vapor pipes, from the first to the last without danger of contamination from other liquors. I have shown both the pipe 19 and the pipes 44 for answering the same ends but if desired they and said pipe 19 may be used interchangeably.

All of the pans are identical in construction and size as well as the various pipe fittings and sections, except the vapor sections 4, 8 and 11 and the "special vapor pipe" sections which increase in diameter to accommodate the increased volume of vapor due to reduced pressure, by which it is possible to replace parts at a minimum of expense.

All of the separate rows of pans A, D, G; B, E, H and C, F, I can be operated as single effects since they can have communication directly with the condenser through the special vapor pipe 40. Such a result is made possible by closing the valves 35 in the several vapor pipes 6, and the valves 36 of the several vapor pipes 10 and opening the valve 41, 42 and 43 of the "special vapor pipe" the vapors from each pan being drawn directly through to the headers 30' into the said pipe 40 to the condensers 13; the steam for evaporating purposes being introduced to the pans B and A through an auxiliary steam connection 49 connected to any convenient source of exhaust steam. Again, by my arrangement of connections, the pan A can be operated as a single effect while the pans B and C can be operated together so as to produce a double effect, and, as above, pans A, B, C, can be operated as a triple effect for a certain kind of liquor, and D, E, F for another, and G, H, I for still another and so on.

Where A, B and C are operating as a triple effect and it is desired to clean or repair the pan B, that pan is drained through a valve 50 in its pipe 21, into the pipe 19, and by way of pipe 23 into pan A. The liquor is then immediately drawn over into A by the higher vacuum in the latter, closing, of course, the valved connection 20' of the pan disconnected. Then, by closing the valves 35 and 34 of the vapor pipes 6 and 8 respectively repairs may begin. Also, having closed the valved connection 20', a normally closed valve 51 in the pipe 19 is opened in order to permit C and A to communicate with one another. After repairs are made to the said pan B the original conditions are restored by reversing the operations just described but in the above case A and C have been operating as a double effect by carrying the vapor over through the separate vapor pipe 40 through the valves 41 and the "catch alls" 9 and pipe 10. Thus in making repairs it is not required at any time to stop operation when using a single line of effects as above, or when the whole system is working together. All of the vapor pipes 4 have intercommunication with the vapor header 30', the vapor pipes 8 and 11 likewise have connection with their respective vapor headers so that in the case of an evaporator consisting of a large number of pans the vapors are distributed over the entire apparatus so that the added pressure due to cutting out one pan is distributed over the remaining pans and the capacity practically unaltered.

When desired a series of say two pans A, D or B, E, for example, may be cast together a single wall answering as the dividing wall between them but this lies within the meaning of the invention.

My evaporator is of great value by reason of its adaptability to all purposes where such an apparatus is needed. A single pan is suited to the requirements of a very small industry where the owner cannot afford to tie up a large amount of capital in a pan whose capacity greatly exceeds his demands. On the other hand as his plant grows larger he is able to add additional pans or units at comparatively little expense to meet his needs—growing slowly or rapidly in the addition of pans as occasion requires; in individual pan capacity, or "effects," or both.

The valves for controlling the various pipes are all easily accessible and a point of considerable merit in my "unit" type of evaporator is that in employing a considerable number of small units in place of one or two exceedingly large ones, as is customary, the liquor is distributed over a large horizontal area so that a sudden increase in the amount of liquor going to the evaporator will cause only a slight rise of liquor level not sufficient to cause entrainment or large losses due to boiling over during lack of attention on the part of the attendant, and little care is necessary in fact at any time after being once set in operation. In other types, however, danger of boiling over and entrainment is imminent and very close attention is required by an attendant of long experience and training. The above advantage and that of never requiring that the plant be shut down for slight or even extensive repairs to a pan or pans, coupled with other advantages brought out herein at length, are too important to be overlooked and an inexperienced person in a few minutes with slight instructions can easily oversee operations.

Other means, of course, such as a valve, for example, would act in place of each of the flanges 47 in the several pipes cross connecting the series of pans, but the flanges absolutely prevent contamination of the different liquors whereas a valve perhaps would not be dependable since at times inclined to leak.

While I have shown the "special" vapor pipe 40 at two places only, one may be connected between each section 30', of the vapor conduit, after the manner shown in Fig. 3, so that any one pan or any series of pans A, B, C; D, E, F, may be separately connected with the place of discharge of its vapors; this being within the meaning and intent of the invention. And it is to be understood that other changes may be made that will also be within the meaning of the invention and its claims.

By preference, in some of the claims I designate the pans or units "unit-pans."

I am aware of an evaporating system in which all of the several pans of the series are connected in a circle, each pan used in rotation for the initial or first effect pan and each also, in rotation, as the last effect of the series. But this system does not admit of increasing the capacity of the system and in fact the arrangement is merely a triple effect apparatus whose last effect is connected each into the first.

Having thus described my invention, I claim:—

1. An evaporating apparatus comprising two series of vacuum pans, individual vapor pipes connecting each effect of each series of pans in sequence to constitute each series a multiple effect evaporator, each pipe including a valve, an individual main vapor conduit for each series of pans, each connected with the several individual pipes of a series, and including valves therein to control each place of communication, a pipe common to and connecting both the said main vapor pipes, a liquor pipe connecting the individual effects of each series of effects including controlling valves for each effect, and a pipe common to and connecting the said liquor pipes with one another.

2. An evaporating apparatus consisting of two series of vacuum pans, each series constituting a separate multiple effect vacuum system, individual valved vapor conduits connecting the several pans of each series, a main vapor conduit connecting all of the individual conduits of a series and including therein a valve at the connection with each of the said individual conduits, a separate liquor conduit for each series, the same including a branch connected to each pan of the series and also including a valve in each said branch, and a series of pipes connecting the separate liquor conduits.

3. An evaporating apparatus having the adaptability of increasing its number of "effects" and its capacity of individual effects consisting of unit-pans connected in two directions one to increase the said number of "effects" and in the other to increase the capacity of individual effects and including a liquor line common to all of the effects and valves for isolating any one of the effects from said liquor line, and including also a vapor pipe common to all of the said effects and valves for isolating any one of the effects from said pipe.

4. An evaporating apparatus made up of a number of unit-pans connected together in two series to form two multiple effect evaporators, all the pans of both series having intercommunication.

5. An evaporating apparatus comprising a plurality of series of unit pans, each series of said pans being connected to constitute in itself a multiple effect evaporator, pipe connections for intercommunication of vapor with all of the pans of the plurality of series including valves to isolate one or more of the pans for the others, and liquor pipe connections for intercommunication of all of the pans of the plurality of series including valves to isolate one or more of the pans from the others.

6. An evaporating apparatus comprising two series of evaporating pans, including connections for each series, all of the pans of a series adapted to be connected in sequence in one direction to constitute a multiple effect and adapted also to be connected in the other direction with those of the other series for increasing the capacity of individual effects, a common liquor pipe for each series, a pipe connecting each individual pan with said common pipe, a valve in each of the individual pipes, a common vapor pipe, a pipe connecting each individual pan with said common vapor pipe, and a valve in each individual pipe.

7. An evaporating apparatus comprising two series of evaporating pans, including connections for each series, all of the said pans of a series adapted to be connected in sequence in one direction to constitute a multiple effect and adapted also to be connected in the other direction with those of the other series for increasing the capacity of individual effects, a common liquor pipe for each series, a pipe connecting each individual pan with said common pipe, a valve in each of the individual pipes, a common vapor pipe, a valved vapor pipe connecting each effect of a series with the next effect, a branch connecting each said valved vapor pipe with the common vapor pipe, and a valve in each said branch.

8. An evaporating apparatus comprising two series of evaporating pans, including connections for each series, all of the said pans of a series adapted to be connected in sequence in one direction to constitute a multiple effect and adapted also to be connected in the other direction with those of the other series for increasing the capacity of individual effects, a common liquor pipe for each series, a pipe connecting each individual pan with said common pipe, a valve in each of the individual pipes, a common vapor pipe, a valved vapor pipe connecting each effect of a series with the next effect, a branch connecting each said valved vapor pipe with the common vapor pipe, a valve in each said branch, and a series of pipes cross communicating the common vapor pipes of the two series of pans.

9. The combination of a plurality of series of evaporating pans, a valve controlled liquor pipe connecting each pan of a series with the next of the series to produce a multiple effect evaporator, a valve controlled liquor pipe connecting each pan of a series with the corresponding pan of an adjacent series, and a vapor pipe connecting all of the pans of said plurality of series of pans.

10. The combination of a plurality of series of evaporating pans, a valve controlled liquor pipe connecting each of a series of pans with the next of the series to produce a multiple effect evaporator, a valve-controlled liquor-pipe connecting each pan of a series with a corresponding pan of a next series, a valved vapor pipe connecting each pan of a series with the next of the series, a vapor pipe separately cross-connecting all of the valved vapor pipes of each series, and a vapor-pipe connected with the vapor system through which the vapors of all the pans of the said plurality of series communicate.

11. An evaporating system comprising a plurality of series of effects including vapor pipes connecting the effects of each series with one another in sequence, a vapor conduit for each series each connected with and common to all of the vapor pipes of its series, and a separate pipe connecting the vapor pipe of each effect of one series with the pipe of the same effect of another series.

12. An evaporating system comprising two series of vacuum pans, the pans of each series having connecting pipes for the introduction and discharge of liquors, the discharge of vapors, and the introduction of a heating agent, and a conduit connecting each of the several said pipes of one series with the corresponding pipes of the other series.

13. An evaporating apparatus comprising two series of pans, pipes connecting the pans of each series of pans in sequence to constitute each series a plurality of effects, a discharge pipe for vapor communicating with all of the pans of a series and with which each of the pans directly communicates, pipes for liquor and vapor connecting each pan of a series with a like pan of an adjacent series, and means in each of the several liquor pipes for controlling their passages, the several last named vapor pipes being adapted for receiving members to separate the vapor of one pan therein from those of a corresponding pan.

14. An evaporating apparatus made up of a series of pans, a separate liquor pipe and a valved vapor pipe between and connecting one pan with the next in sequence to constitute a plurality of effects, a pipe connecting two of the liquor pipes, a valve included therein, a common vapor pipe, including a separate valved branch leading to each vapor pipe connecting two pans, and a second like series of pans cross connected with the first said series and including connections for liquor and vapor therewith, the two series adapted for intercommunication.

15. An evaporating apparatus comprising a series of unit-pans connected together to constitute a system of multiple effects, a second series of unit-pans likewise connected to constitute a system of multiple effects, all the pans of both series having intercommunication with respect to their vapors and liquors, conduits through which communication of liquors is established between the two series, and a valve in each of the said conduits.

16. An evaporating apparatus comprising a series of unit-pans, means to connect them to constitute a system of multiple effects, a second series of unit-pans, means also to connect them to constitute a system of multiple effect, and conduits through which the effects of each series communicate with one another.

17. An evaporating apparatus comprising a series of unit-pans, pipes connecting the pans to constitute a system of multiple effects, a second series of unit-pans connected in like manner, a conduit connecting each of the pipes of one series with the corresponding pipe of the other series, and a conduit for liquors connecting like pans of one series of pans with the other.

18. An evaporating apparatus comprising a series of unit-pans, means connecting them in series to constitute a system of multiple effect, a second series of unit-pans, means to connect them also as multiple effects, a conduit connecting the several means of one series with the corresponding means of the other series, a conduit through which the liquors of corresponding pans of each series communicate, a vapor discharge conduit communicating with and common to all of the pans of both series, and valves to control the vapor discharged from a given pan.

19. An evaporating apparatus comprising a series of unit-pans, a valved vapor-conduit between and connecting adjacent pans to constitute a system of multiple effects, a second series of unit-pans, a valved vapor-conduit between and likewise connecting adjacent pans of that series, a vapor discharge conduit with which any pan of either series communicates, valves in said conduit for interrupting communication of any one pan with said conduit, a liquor equalizing conduit connecting all the pans, and a valve therein at each pan.

20. An evaporating apparatus comprising a plurality of unit-pans, valved vapor and liquor connections between the pans to constitute a multiple effect, a second plurality of unit-pans likewise connected to form a multiple effect, vapor and liquor pipes cross-connecting the two series of pans, a valved vapor conduit common to all of the pans, and a valved liquor conduit also common to all of the pans.

21. An evaporating apparatus comprising a plurality of unit-pans, vapor and liquor connections between the pans to constitute a multiple effect, a second plurality of unit-pans, vapor and liquor pipe connections between the pans to constitute a multiple effect, valves in all of the connections for isolating any one of the pans from the others, vapor conduits through which all the pans of both series are in communication, an equalizing liquor pipe common to all of the pans of both series, valves therein by which to disconnect any one pan of either series, a vapor pipe common to all of the pans of both series, and valves therein by which to disconnect any one pan therefrom as to its vapors.

In testimony whereof I affix my signature, in presence of two witnesses.

LOUIS P. BAUER.

Witnesses:
CHARLES V. MILES,
EUNICE BECKUM.